United States Patent [19]

Partin et al.

[11] 4,257,239
[45] Mar. 24, 1981

[54] EARTH COIL HEATING AND COOLING SYSTEM

[76] Inventors: James R. Partin, 3623 N. Park Dr.; James E. Bose, 524 E. Tyler Ave.; Carl W. Ledbetter, 323 E. Airport, all of Stillwater, Okla. 74074

[21] Appl. No.: 1,078

[22] Filed: Jan. 5, 1979

[51] Int. Cl.³ .................. F25B 27/02; F25D 23/12; F25B 13/00
[52] U.S. Cl. .................. 62/238.7; 62/260; 62/324.6; 165/45
[58] Field of Search ............ 62/2, 260, 324 D, 238 E; 126/400; 165/45

[56] References Cited

U.S. PATENT DOCUMENTS

| | | | |
|---|---|---|---|
| 2,513,373 | 7/1950 | Sporn et al. | 62/260 X |
| 2,529,154 | 11/1950 | Hammond et al. | 62/260 X |
| 2,689,090 | 9/1954 | Wetherbee et al. | 62/260 X |
| 2,726,067 | 12/1955 | Wetherbee et al. | 62/260 X |
| 2,749,724 | 6/1956 | Borgerd et al. | 62/260 |
| 4,042,012 | 8/1977 | Perry | 62/260 X |

*Primary Examiner*—Lloyd L. King
*Attorney, Agent, or Firm*—Head & Johnson

[57] ABSTRACT

A heating and cooling system having a refrigerant heat pump employing first and second evaporator-condensers with a reversing valve, a refrigerant-to-water heat exchanger embodying the first evaporator-condenser, an elongated conduit buried in the earth and connected with the heat exchanger, and means positioned in the earth to maintain the earth in wet condition adjacent the conduit so that heat is efficiently transferred between the conduit and the earth.

6 Claims, 6 Drawing Figures

EARTH COIL HEATING AND COOLING SYSTEM

BACKGROUND AND OBJECTS OF THE INVENTION

A type of heating and air conditioning system commonly employed is referred to as the "heat pump". In this system, a compressor cycles a refrigerant through a first evaporator-condenser and a second evaporator-condenser. A heat pump system includes the first evaporator-condenser, which is located within the building and associated with a fan system for moving air through the building, and a second evaporator-condenser located exteriorly of the building. Existing heat pump systems normally employ a fan for moving ambient air past the evaporator-condenser. In the heat mode, the first unit functions as a condenser and the second unit, located outside the building, functions as an evaporator. When the unit operates in the cooling mode, the first or indoor unit functions as a condenser, and the second, or outdoor unit, functions as an evaporator.

While this existing type of refrigerant-to-air heat pump is inherently an efficient means of heating and cooling, it has one defect in that the efficiency varies greatly according to the ambient temperature. The ambient air temperature is normally opposite of that which would produce the maximum unit efficiency. The refrigerant-to-air heat pump becomes increasingly inefficient in the heating mode as ambient temperatures drop below 40° F.

Others have suggested that the heat pump system be combined with an earth coil in which the refrigerant is moved through an extended tube or conduit placed in the earth. The temperature of the earth remains much more consistent than that of the ambient air temperature. However, when attempts have been made to employ earth coils in which the refrigerant is circulated through the coil, it has been found that the amount of refrigerant coil necessary to obtain sufficient heat transfer with the earth makes the use of a refrigerant type earth coil too expensive to install to be practical. To overcome this problem, others have suggested utilizing an earth coil in which water is circulated and the water used to exchange heat with the refrigerant. However, such systems have not become commonly acceptable for a number of reasons. A primary reason is that a pipe passing through the earth does not normally afford good heat transfer. An object of this invention is to provide an improved means of achieving the transfer of heat from a water-to-earth heat exchanger. Another difficulty which has existed with previous efforts to utilize water-to-earth heat exchangers is the problem of controlling the flow of water to heat the refrigerant-to-water heat exchanger. These problems are overcome with control apparatus provided in this invention.

Others have also attempted to use water wells in system where well water is pump from the earth to a water-to-refrigerant exchanger. The problem here is that natural chemicals in well water attack the components of the exchanger and form deposits on the exchanger coils. After a length of time, the deposit build-up interferes with the heat exchange between the water and the coils. When the used water is pumped back to the earth through a second well, the possibility of aquifier contamination exists. When the water is simply wasted on the surface, aquifier depletion is a problem in most parts of the country.

Another attempt to improve the efficiency of heat pumps is the use of cooling towers. The problem with cooling towers, however, is that evaporation of water causes scaling or corrosion of tower components, and sunlight causes growth of algae. In order for cooling towers to function properly, regular and thorough preventive maintenance programs are required which are both time-consuming and expensive.

The present invention is directed towards a heat pump system for heating and air conditioning a structure employing water as a vehicle for transferring heat in a closed system which is protected from evaporation and from sunlight.

Another object of the present invention is to provide a heating and air conditioning system utilizing the heat pump principle and utilizing water as a means of transferring heat to and from the earth and in an arrangement wherein the water is maintained in a closed system substantially eliminating routine maintenance.

These general objects, as well as other and more specific objects of the invention, will be fulfilled in the following description and claims, taken in conjunction with the attached drawings.

DESCRIPTION OF THE DRAWINGS

FIG. 2A shows the arrangement wherein the earth coil is in conjunction with a septic system lateral line. FIG. 2B shows the arrangement wherein the earth coil is used in conjunction with a soaker pipe.

SUMMARY OF THE INVENTION

A heating air conditioning system for a structure is described employing the heat pump concept. The unit includes a compressor, normally driven by an electric motor, and two evaporator-condenser units. The second evaporator-condenser unit is positioned within the structure and includes a blower means for distributing heated or cooled air within the structure. A reversing valve is positioned in series with the compressor and the first and second evaporator-condensers so that in one mode of the valve the first evaporator-condenser functions as an evaporator and the second evaporator-condenser functions as a condenser; and in the other mode, the functions are reversed. A refrigerant-to-water heat exchange is provided which embodies the first evaporator-condenser in an arrangement wherein heat is transferred to or from the first evaporator-condenser with water. An elongated conduit having a major portion buried in the earth is employed, forming an earth coil, the conduit being connected in series with the refrigerant-to-water heat exchanger. A pump is in series with the heat exchanger and the conduit to circulate water through the heat exchanger and the conduit in a closed system. Means are provided in the earth adjacent the conduit to maintain the earth in wet condition so that heat is effectively transferred between the water circulating in the conduit and the earth. Thus, the combination of the water carrying earth coil and refrigerant-to-water heat exchanger functions as a means of moving heat between the first evaporator-condenser and the earth.

DETAILED DESCRIPTION

Figure 1:
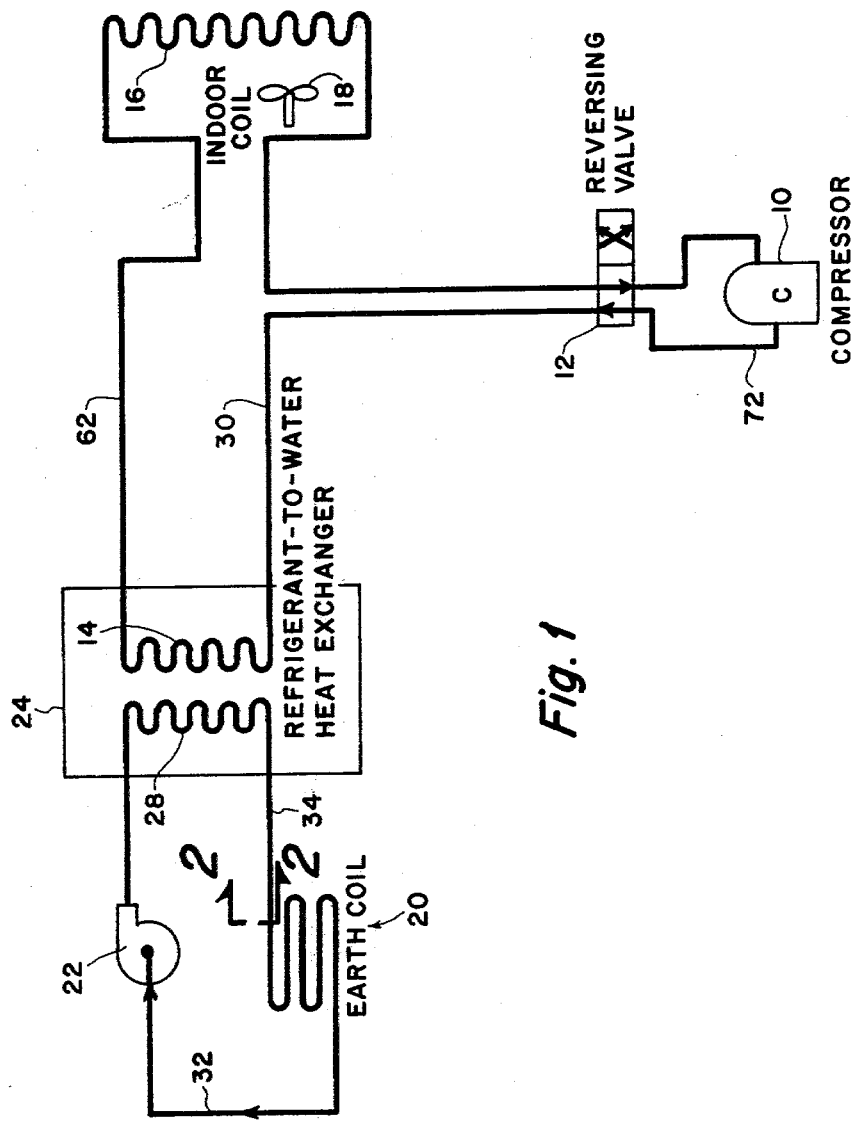
FIG. 1 is a schematic diagram of a heating and air conditioning system employing this invention.

Referring to the drawings and first to FIG. 1, a heating and air conditioning system employing the principles of this invention is illustrated in diagrammatic form. The essential elements of the system are: A compressor 10, commonly driven by an electric motor; a reversing valve 12; a first evaporator-condenser 14; a second or indoor evaporator-condenser 16 which includes a blower 18 for moving heated or cooled air; an elongated length of water filled conduit, the major portion of which is buried in the earth as an earth coil 20; a water pump 22; and a refrigerant-to-water heat exchanger 24. The elements 10 through 18 mentioned above are those which are commonly employed in a heat pump heating and air conditioning system and used in many homes and buildings today. In the typical heat pump system employed today, the first evaporator-condenser 14 is mounted exteriorly of the building and includes a fan (not shown) so that ambient air is drawn through the coil. When the typical heat pump is in the heating mode, as controlled by reversing valve 12, the first coil 14 functions as an evaporator, and the second coil 16 functions as a condenser; whereas, when the reversing valve is actuated to provide air conditioning, the first coil 14 functions as a condenser and the second or indoor coil 16 functions as an evaporator. As has been previously indicated, the heat pump becomes inefficient as ambient temperatures vary to the extreme. In the heat mode, first coil 14 functions as an evaporator, that is, absorbs heat from the ambient air; and during severe cold weather when the ambient temperature is below the 30° to 40° F. range, the rate of exchange of heat from the ambient air with coil 14 is inefficient, thereby reducing the efficiency of the heat pump system.

Figure 4:
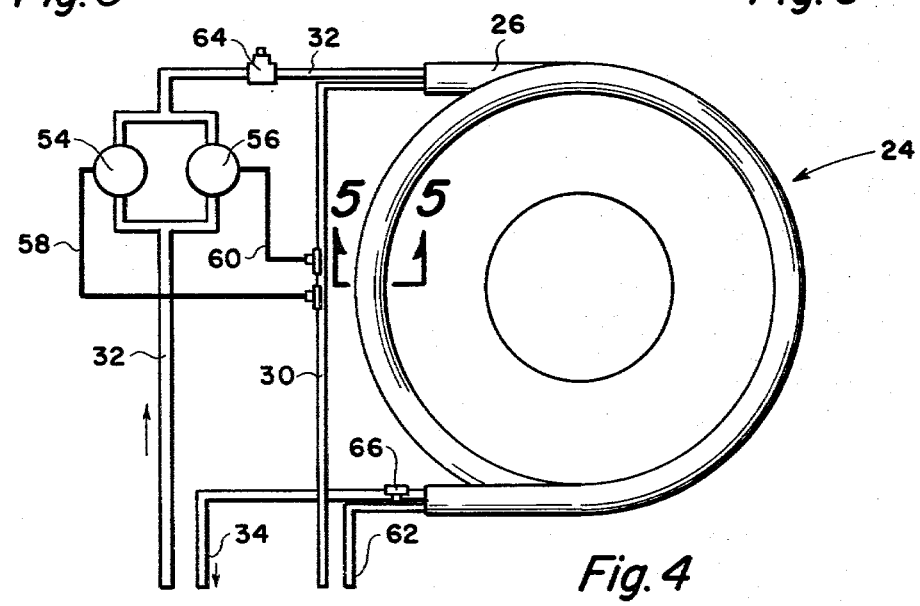
FIG. 4 is a schematic diagram of the control unit of the refrigerant-to-water heat exchanger as employed in the invention.

The refrigerant-to-water heat exchanger 24 of the present system greatly improves the efficiency of the heat pump system. The heat exchanger 24 may be in the form of a long two-conductor tube 26 as shown in FIG. 4, the tube being coiled for purposes of conserving space. As shown in the cross-sectional view of FIG. 5, tube 26 has within it a water tube 28. The internal diameter of tube 26 is much greater than the external diameter of water tube 28, and the total interior 26A is filled by refrigerant which is connected to refrigerant tube 30. Water conduits 32 and 34 communicate with the ends of tube 28 and to the earth coil 20. In this arrangement refrigerant tube 26 functions as first coil 14.

Figures 2A, 2B:
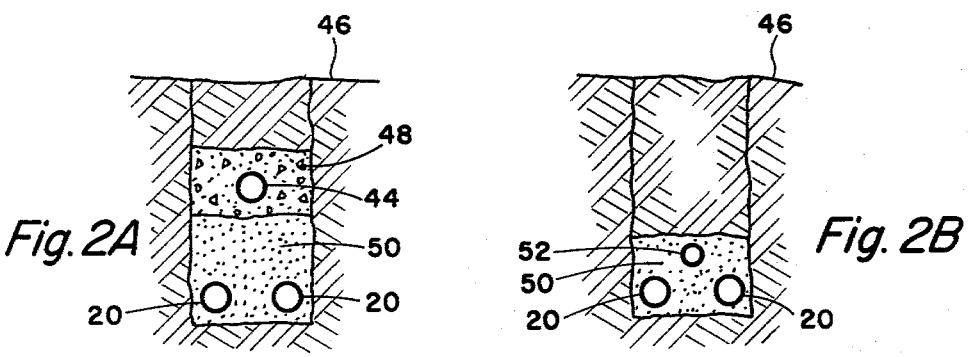
FIGS. 2A and 2B are cross-sectional views taken along the line 2—2 of FIG. 1 showing the arrangement of the improved earth coil.

FIGS. 2A and 2B are cross-sectional views showing the arrangement of the earth coil. Referring first to FIG. 2A, earth coil conduit 20 is in the form of a continuous loop and is preferably laid out in the field shown in FIG. 3 in conjunction with a septic system. The septic system includes a line 36 from the house sanitary sewer outlet to a septic tank 38 in the ground. From tank 38 a discharge line 40 connects to a series of distribution boxes 42 and from distribution boxes, the effluent flows to perforated lateral lines 44. In some instances, the lateral lines 44 are formed by short lengths of conduit such as 1 foot length with a small space between each length of conduit permitting water flowing from the septic tank 38 to seep into the ground. FIG. 2A shows a lateral line 44 buried beneath the earth's surface 46, usually at a depth of 1 foot or more below frost line. Typically, the lateral line 44 is encased in porous material such as gravel 48 so as to increase the absorption by the earth of the discharge effluent. In the preferred arrangement of the present invention, the earth coil 20 is located below lateral lines 44 and preferably in a porous medium such as sand 50. This permits water from the lateral line 44 to pass through the gravel 48 surrounding the lateral line into sand 50 ensuring that the earth around the pipe coil 20 is wet.

When the system of this invention is being installed where a septic system is not employed, the arrangement of FIG. 2B may be utilized in which a soaker pipe is positioned above the earth coil 20. The soaker pipe will typically be a perforated pipe placed in the sand 50 and at a depth of 1 foot or more below the frost line. Water is pumped into the soaker pipe 52 in sufficient quantities to keep the earth wet around the earth coil 20.

Earth coil 20 is typically formed of plastic pipe, such as PVC, and is preferably of about 4 inches in diameter. This size provides about one square foot of contact with the earth for each lineal length of pipe. The use of slip joint pipe couplings help prevent damage to the pipe due to expansion and contraction as the water temperature varies.

When the system is working in the heating mode, first coil 14 functions as an evaporator, cooling water in heat exchanger 24. As cool water is circulated from the heat exchanger through conduit 34 and earth coil 20 by pump 22, the cool water collects heat from the earth, and in effect, transmits the heat back through the heat exchanger 24 into refrigerant coil 14. In the heating mode, the second coil 16 functions as a condenser, and the heat thereof is distributed by fan 18. Thus, the system functions to move heat from the earth as extracted by earth coil 20 for distribution inside the structure by means of fan 18.

When the unit functions as a cooling system, first coil 14 functions as a condenser, and second coil 16 functions as an evaporator. Condenser coil 14 heats the water flowing through heat exchanger 24. The heated water is cooled in earth coil 20, which in turn cools the first coil 14. In this manner, heat which is extracted from inside the structure by means of the coil 16 functioning as an evaporator is conveyed to the earth.

It can be seen that whether the apparatus is functioning either in the heating or cooling modes, the earth functions as a heat reservoir–in one case supplying heat, and in another case absorbing rejected heat.

The efficiency of the heat pump is substantially immune to the ambient air tempterature and is significantly greater than heat pumps utilizing air exchange when the ambient temperature is below 40° F.

An important aspect of the invention is the arrangement for controlling the refrigerant-to-water heat exchanger 24, as best illustrated in FIG. 4. Water circulated by pump 22 from the earth coil 20 flows to the heat exchanger 24 through conduit 32 and out of the heat exchanger through conduit 34. Conduit 32 is branched and includes a head pressure control valve 54 and a suction pressure control valve 56. Valves 54 and 56 are connected by capillary tubes 58 and 60 to refrigerant line 30. With the reversing valve 12 in the cooling mode wherein coil 14 is functioning as the condenser, valve 54 regulates the water flow through the heat exchanger 24. If the head pressure rises above a predetermined spring setting on valve 54, the valve will open and allow more water flow through the heat exchanger, thus increasing the heat transfer from the refrigerant and reducing the head pressure resulting in optimum operation of the heat pump. Refrigerant line 62 connects first coil 14 with second coil 16. Line 30 is the discharge line during the cooling mode, and the suction line during the heating mode.

With the reversing valve 12 in heating cycle, valve 54 is closed. Valve 56 opens on a drop in suction pressure sensed by capillary tube 60. Thus, valve 56 controls the water flow through the heat exchanger 24 to regulate the suction pressure at a level predetermined by the spring setting the valve 56.

A bleed valve 64 is used to release any air trapped in the closed water system. As an additional improvement, an anti-freeze thermostat 66 prevents heat exchanger freeze-up which may be caused by blocked flow, pump failure, or low water inlet temperature by opening the low voltage control circuit (not shown) to compressor 10.

Figures 3, 5:
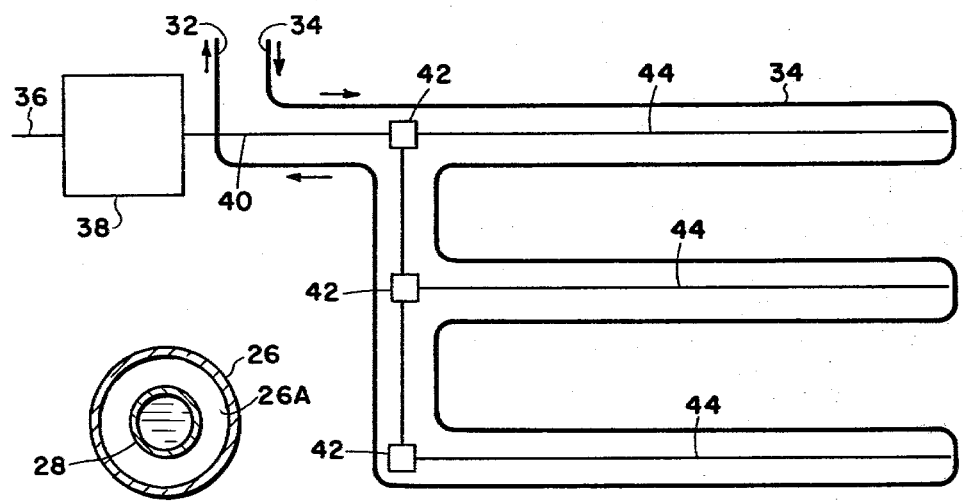
FIG. 3 is a plan view of a typical earth coil arrangement used in conjunction with a septic system.
FIG. 5 is a cross-sectional view of a pipe which maybe employed as the refrigerant-to-water heat exchanger portion of the invention.

Instead of the earth coil being laid horizontally in trenches as shown in FIGS. 2A, 2B, and 3, a vertical type earth coil may be used, which is particularly adaptable where space is a premium. In the vertical system a well bore hole is drilled. A casing is inserted in the well and is capped at both the top and bottom to provide a closed system as with the earth coil. A water inlet pipe extends through the top cap and terminates within the casing adjacent the bottom. The return water line communicates with an opening in the casing top cap. Water circulated in the well is discharged near the bottom from the inlet pipe and migrates to the top as circulation continues so that the water is heated or cooled, as the case may be, as it circulates in the well casing in the same manner as in the earth coil.

As previously indicated, the heating and cooling system of this invention has many advantages over other type systems such as the use of water wells, direct burial of refrigerant lines or cooling towers. The invention provides a heating and air conditioning system characterized by: (a) an earth coil with a sealed water system; (b) no aquifer pollution or depletion; (c) the use of 40° to 80° water to the heat pump for high efficiency; (d) an arrangement which inherently has low maintenance requirements; (e) aesthetically and acoustically pleasing in that no blower type air heat exchanger is employed; (f) does not require a defrost cycle, which results in significantly improved efficiency over the standard refrigerant to air heat exchanger type heat pumps; and (g) substantially eliminates the need for auxiliary resistance heating as employed in most present-day heat pump systems.

While the invention has been described with a certain degree of particularity, it is manifest that many changes may be made in the details of construction and in the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A heating and air conditioning system for a structure, comprising:
   a compressor;
   a first evaporator-condenser;
   a second evaporator-condenser located within the structure including blower means for distributing heated or cooled air;
   a reversing valve in series with said compressor and said first and second evaporator-condensers whereby in one mode of the valve the first evaporator-condenser functions as an evaporator and the second evaporator-condenser functions as a condenser, and in the other mode the functions are reversed;
   a refrigerant-to-water heat exchanger embodying said first evaporator-condenser and having a water passageway;
   an elongated earth coil conduit having the major portion laid out in a pattern forming an earth coil field wherein the earth coil is buried at a generally horizontal and uniform depth below frost line, the earth coil conduit being connected in series with said water passageway, forming a closed water-to-earth heat transfer system;
   a pump in series with said heat exchanger, water passageway and said conduit for circulating water therethrough in a closed system;
   means positioned in the earth adjacent to said earth coil to maintain the earth in wet condition around said earth coil whereby heat is transferred between said heat pump refrigerant and the water and from the water to the earth;
   a cooling mode flow control valve in series with said refrigerant-to-water heat exchanger water passageway;
   means of detecting the pressure of refrigerant entering said refrigerant-to-water heat exchanger; and
   means to control said cooling mode flow control valve in response to the pressure of refrigerant to open said cooling mode flow control valve in response to rising refrigerant pressure.

2. A system according to claim 1 wherein said means of maintaining the earth adjacent to said conduit in wet condition includes a perforated soaker pipe buried adjacent said conduit for discharging water into the earth.

3. A system according to claim 1 wherein said means of maintaining the earth adjacent said conduit in wet condition includes a septic system lateral line buried adjacent and above said circuit.

4. A heating and air conditioning system for a structure, comprising:
   a compressor;
   a first evaporator-condenser;
   a second evaporator-condenser located within the structure including blower means for distributing heated or cooled air;
   a reversing valve in series with said compressor and said first and second evaporator-condensers whereby in one mode of the valve the first evaporator-condenser functions as an evaporator and the second evaporator-condenser functions as a condenser, and in the other mode the functions are reversed;
   a refrigerant-to-water heat exchanger embodying said first evaporator-condenser and having a water passageway;
   an elongated earth coil conduit having the major portion laid out in a pattern forming an earth coil field wherein the earth coil is buried at a generally horizontal and uniform depth below frost line, the earth coil conduit being connected in series with said water passageway, forming a closed water-to-earth heat transfer system;

a pump in series with said heat exchanger, water passageway and said conduit for circulating water therethrough in a closed system; and means positioned in the earth adjacent to said earth coil to maintain the earth in wet condition around said earth coil whereby heat is transferred between said heat pump refrigerant and the water and from the water to the earth;

a heating mode flow control valve in series with said refrigerant-to-water heat exchanger water passageway;

means of detecting the pressure of refrigerant entering said refrigerant-to-water heat exchanger; and means to control said heating mode flow control valve in response to the pressure of refrigerant to open said heating mode flow control valve upon decrease in refrigerant suction pressure.

5. A system according to claim 4 wherein said means of maintaining the earth adjacent to said conduit in wet condition includes a perforated soaker pipe buried adjacent said conduit for discharging water into the earth.

6. A system according to claim 4 wherein said means of maintaining the earth adjacent said conduit in wet condition includes a septic system lateral line buried adjacent and above said conduit.

* * * * *